April 17, 1956 L. B. EHRLICH ET AL 2,741,792
WINDSHIELD WIPER BLADE
Filed May 26, 1951
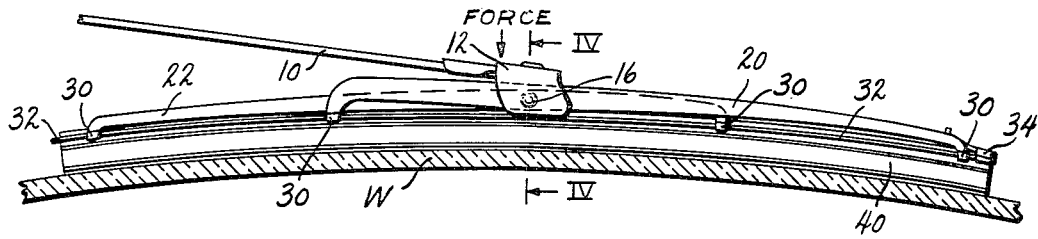
Fig. I
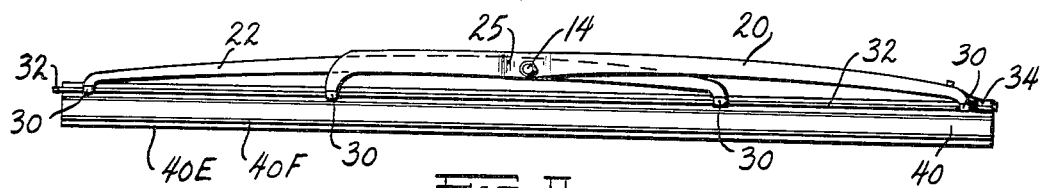
Fig. II
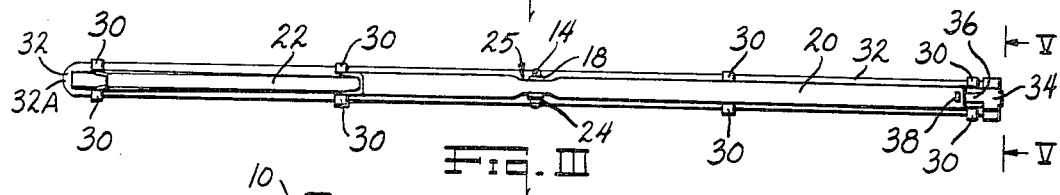
Fig. III
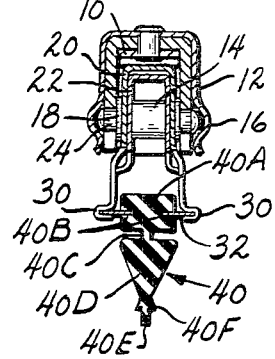
Fig. IV
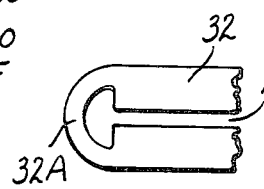
Fig. VI
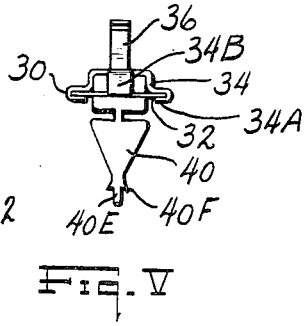
Fig. V
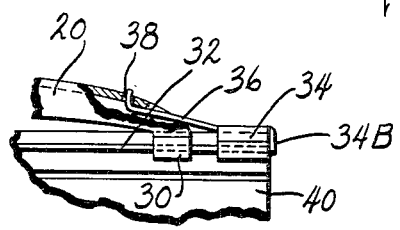
Fig. VII
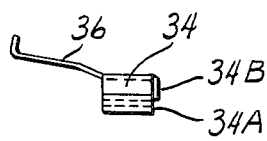
Fig. VIII
INVENTORS.
Louis B. Ehrlich &
BY William S. Vargo
Falvey, Souther & Stoltenberg

United States Patent Office 2,741,792
Patented Apr. 17, 1956

2,741,792

WINDSHIELD WIPER BLADE

Louis B. Ehrlich, Toledo, and William S. Vargo, Cincinnati, Ohio

Application May 26, 1951, Serial No. 228,448

7 Claims. (Cl. 15—245)

This invention relates to windshield wiper blades, more particularly to windshield wiper blades suitable for use on curved windshields.

This invention contemplates the provision of a windshield wiper blade which is suitable for use on a curved windshield, the blade being suspended and pivoted from an oscillating wiper arm, so that the contact pressure is substantially evenly distributed over the whole length of the blade whereby good wiping contact is maintained with the glass of the windshield. The blade suspension allows accommodation of the blade to the curvature of the glass as the blade is swept across the glass in the locus of a circle having its center at the pivot of the wiper arm, so that a good "wipe" is obtained and the glass effectively cleared of foreign substances and transparent for clear vision.

The invention further contemplates the provision of a windshield wiper blade which has improved operating characteristics and also is of a pleasing appearance for use in automobiles where these blades are always in view by the occupants of the vehicle.

It is, therefore, a principal object of this invention to provide a windshield wiper blade which can accommodate itself to curvature changes in its sweep across a windshield having a curved conformation.

It is a further object of this invention to provide a suspension for a windshield wiper blade which maintains substantially equal pressure on all portions of the blade as the blade sweeps across a curved windshield and is subjected to curvature change.

It is a further object of this invention to provide a windshield wiper blade suitable for use with a curved windshield in which the sweep of the blade is in the locus of a circle.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is an elevational view of a windshield wiper blade incorporating the invention;

Fig. 2 is a view, similar to Fig. 1, with the blade removed from the oscillating wiper arm;

Fig. 3 is a plan view of the blade;

Fig. 4 is a sectional elevation taken along line 4—4 of Fig. 1;

Fig. 5 is an end view taken along line 5—5 of Fig. 3;

Fig. 6 is a plan view of a detail of the blade mounting;

Fig. 7 is an elevational view, partly in section, of the blade end; and

Fig. 8 is an elevational view of a detail.

Referring now to the drawings, particularly to Fig. 1, an arm 10 is shown which will be driven by an oscillatory shaft (not shown) which sweeps through the locus of a circle having its center in such oscillatory shaft. On the terminus of the arm, a spring clip device is provided which suspends the blade assembly by cooperating with a trunnion 14 on the blade, the trunnion being held by spring tension in a pair of protuberances 16 nesting the rounded ends of the trunnion, so that the blade may move through a small angle in a plane transverse of the trunnion.

The trunnion 14 is provided with an integral collar 18 which fits against the side of the outer of a pair of nesting channel-shaped members 20 and 22, which have aligning apertures, through which the trunnion 14 is fitted to form a pivot point for the nesting members to allow slight relative movement between them. Adjacent the point where the trunnion extends through the nesting members 20 and 22, the outer member is necked to form a construction 24 for providing an inner bearing surface to cooperate with the outside of the inner member 22 to reduce friction to movement between the members by providing a clearance.

The nesting channel-shaped members 20 and 22 have their webs facing outwardly toward the arm 10 and away from the curved windshield 26, with the side walls substantially normal to the windshield. The general conformation of these members is curved having a radius of curvature, within whose locus the webs of the members are to be found. The radius of curvature approximates that of the curved windshield whose surface is to be cleaned. It is essential that the members 20 and 22, acting about the trunnion 14 as a pivot point, can vary their relations, so that their ends can adjust themselves from a straight line to a curve which has a curvature greater than the curvature of the windshield, or the greatest curvature of such. For this purpose, the inner member 22 and the outer member 20 must be designed to move freely when the ends of both members are in the locus of a straight line as shown in Fig. 2, and move without binding or making contact at the webs until the members assume the position of curvature determined by the greatest curvature of the windshield glass.

The ends of the members 20 and 22 are each provided with a pair of depending claws 30 which engage the sides of a flat spring member 32, as is best seen in Fig. 5, and form a mounting means for it, so that the spring member 32 can assume a flat or curved position parallel to the windshield glass. The member 32 is fitted loosely within the pairs of claws 30 and is thereby given leeway for slight relative sliding movement of the spring member as the curvature changes. At the right end (Figs. 1 and 3), a spring clip 34 is fixedly attached to the end of the spring member, having an inwardly extending tongue 36 which engages in a slot 38 in the end of the outer member 20. This establishes a fixed relation between the spring member 32 and the nesting members 20 and 22, yet having a sliding relation to compensate for length as the curvature of the element 32 changes. The tongue 36 is adapted for manual manipulation to remove the spring member 32 from its relation with the claws 30 in the event it becomes desirable to change wiping squeegees.

A wiping squeegee element 40 is mounted in a longitudinal slot 42 of the spring element 32, as is best seen in Fig. 4. The spring element 32 is preferably made from a single strip of material which is doubled back upon itself to provide the longitudinal slot 42 between the parallel legs. The single strip of material is attenuated, as shown at 32A, and is then rolled around, as is clearly shown in Fig. 6, with the attenuated portion as a hinge which readily conforms to such rolling without buckling to provide a curved end section as shown in the drawings which also has the function of trapping the squeegee in position at this end. The open end of the spring member 32 is closed by spring clip 34, already described, which bridges both arms of the member and is permanently affixed by crimped flanges 34A after the squeegee element 40 is mounted in position in the slot 42. The clip 34 is provided with a depending tongue 34B which contacts the end of the squeegee and prevents its longitudinal movement outwardly in the slot 42.

The squeegee element 40 is made of rubber having a mounting portion 40A on its upper side provided with a longitudinal slot 40B in its sides, into which is fitted the spring member 32, as already described. Adjacent a central location, the squeegee is provided with a longitudinally extending hinge element 40C symmetrically located on the lower face of the mounting portion 40A, and in the same relative position on the upper face of the wiping element 40D, so that a pair of abutting surfaces are provided on each side of the hinge element 40C to limit the flop of the wiping element 40D as it is moved across the windshield glass by the arm 10. The wiping element 40D is generally triangular in cross-section, terminating at its lower edge in a square-cut portion 40E which provides the sharp edges on the rubber squeegee which perform the wiping action on the windshield glass. Just above the square-cut portion 40E, an enlargement 40F is provided which acts as a guide during the cutting of the portion 40E.

Referring to Fig. 1, it will be noted that the arm 10 provides a downward force in a direction substantially normal to the windshield W, which force is applied to the trunnion 14 and, therefore, at the pivotal point for the nesting members 20 and 22 which suspend by their four ends the spring element 32. The downward force of the arm 10 is applied to the spring element 32 and the squeegee 40 at four points which are selected at proportionate distances depending on the curvature of the windshield W to substantially equalize the four component forces at the four points of suspension of the squeegee blade 40. The blade 40 is bent until the force against the windshield is substantially equal per unit length of the blade (within commercial tolerances) and as the blade is moved over the glass, the curvature changes continually from a straight planar surface to a curved surface with the blade constantly accommodating itself to these changes to give a clean wipe of the glass surface. The flop of the blade 40 occurs about the hinge element 40C as the blade oscillates over the glass, but some small amount of flop may also arise from looseness in the fitting of the mechanical elements due to tolerances in manufacture.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a windshield wiper for a curved windshield, a wiper blade made of flexible material which is normally straight, a flexible metallic backing member for said wiper blade comprising a U-shaped member gripping the wiper blade adjacent its upper edge substantially through its entire length by being trapped in a slot therein, attaching means directly connected to the backing member by a pair of nesting yokes pivoted together intermediate their ends adjacent a central location of the blade and providing four spaced points of attachment for the backing member, including an end attachment and an intermediate one for each yoke, whereby said blade can be attached to an oscillating arm by the pivot point, said blade being normally straight but adapted under pressure exerted by the arm on the pivot point of the attachment means of the backing member to cause the blade to continuously vary its shape as it passes over the curved surface of the windshield.

2. In a windshield wiper suitable for use with a planar or curved windshield surface comprising a flexible body having a wiping edge, a flat spring member attached to the flexible body substantially throughout its length for supporting said flexible body, said flat spring member having its broad surface in parallel juxtaposition to the windshield surface being wiped, a pair of nesting yoke means pivoted intermediate their ends about a central transverse trunnion with reference to the blade and attached to the flat spring member at four spaced points for attaching said member to an oscillating arm, two of said points being intermediate the ends of the blade, one for each yoke whereby force applied by the oscillating arm to the trunnion, pivoting the yokes flexes the flat spring member and the flexible body to conform to the windshield surface being wiped.

3. In a windshield wiper suitable for use with a planar or curved windshield surface comprising a flexible body having a wiping edge, a flat spring member attached to the flexible body substantially throughout its length for supporting said flexible body, said flat spring member having its broad surface in parallel juxtaposition to the windshield surface being wiped, a pair of nested yokes pivoted together intermediate their ends adjacent a central point of the blade and attached to the spring member at four spaced points including an end point and an intermediate point opposite the pivot point for each yoke for attaching said member to an oscillating arm by the pivot point, whereby force applied by the oscillating arm to the pivot point flexes the backing member and the flexible body to conform to the windshield surface being wiped.

4. In a windshield wiper suitable for use with a planar or curved windshield surface comprising a flexible body having a wiping edge, a flat spring member of U-shaped conformation attached to the flexible body substantially throughout its length adjacent its upper edge for supporting said flexible body with its bight, said flat spring member having its broad surface in parallel juxtaposition to the windshield surface being wiped, a pair of nested yokes pivoted together at points intermediate their ends adjacent a central point of the blade attached to the spring member at its edges by four spaced points for attaching said member to an oscillating arm by the pivot point, each yoke being attached to an end of the blade and to an intermediate point on the blade opposite the pivot point, whereby force applied by the oscillating arm flexes the backing member and the flexible body uniformly throughout its length to conform to the windshield surface being wiped.

5. In a windshield wiper for a curved windshield, a wiper blade made of flexible material which is normally straight, a flexible metallic backing member for said wiper blade comprising a U-shaped member gripping the wiper blade substantially throughout its entire length, the blade being positioned in the bight of the U-shaped member, attaching means comprising a pair of nesting yokes directly connected by their ends to the edges of the backing member at four spaced points, trunnion means pivoting the yokes together intermediate their ends adjacent a central position of the blade; whereby said blade can be attached to an oscillating arm cooperating with the trunnion means of the yokes, said blade being normally straight but adapted under pressure exerted by the arm on the trunnion means of the yokes attached to the backing member to cause the blade to continuously vary its shape as it passes over the curved surface of the windshield.

6. In a windshield wiper suitable for use with a planar or curved windshield surface comprising a flexible body having a wiping edge, a flat spring member attached to the flexible body substantially throughout its length for supporting said flexible body for flexure in a plane transverse to the surface to be cleaned, a pressure applying transverse trunnion positioned centrally of the blade, and a pair of nested yokes extending longitudinally of the flexible body cooperating in a pivotal relation with the transverse trunnion and extending on each side thereof to have one end of each yoke attached to a terminating end of the flat spring member, while the other end of each yoke is attached to the spring member at an intermediate point of the member on the opposite side of the trunnion.

7. In a windshield wiper for use with a planar or curved windshield, a flexible wiping body adapted to bend in one plane to conform to the curved windshield, and a pair of cooperating yokes pivoted together intermediate their ends for independent movement about a transverse trunnion centrally located relative to the wiping body, one end of each of the yokes being attached to the wiping body at opposite ends of the wiping body and the other end of each of the yokes being attached at intermediate points spaced from the ends of the body at the opposite side of the trunnion, whereby pressure applied to the trunnion is substantially equalized by the cooperating yokes throughout the length of the body.

References Cited in the file of this patent

UNITED STATES PATENTS

| | | |
|---|---|---|
| 1,996,018 | Hueber | Mar. 6, 1935 |
| 2,149,037 | Zaiger | Feb. 28, 1939 |
| 2,548,090 | Anderson | Apr. 10, 1951 |

OTHER REFERENCES

The Anderson Company, November 1, 1946, pages 2 and 3.